United States Patent

[11] 3,574,281

[72] Inventors Donald L. Casey;
 Gerald W. Miller, Wilmington, Del.
[21] Appl. No. 854,562
[22] Filed Sept. 2, 1969
[45] Patented Apr. 13, 1971
[73] E. I. du Pont de Nemours
 and Company, Wilmington, Del.

[54] DILATOMETER CELL
 14 Claims, 2 Drawing Figs.
[52] U.S. Cl. .................................................. 73/16
[51] Int. Cl. ........................................... G01n 25/16
[50] Field of Search ........................................ 73/16, 149

[56] References Cited
 UNITED STATES PATENTS
 2,448,964  9/1948  Dietert .......................... 73/16
 3,182,497  5/1965  Rubens et al. ................. 73/16

Primary Examiner—James J. Gill
Assistant Examiner—Herbert Goldstein
Attorney—Wilkin E. Thomas, Jr.

ABSTRACT: A cubical dilatometer cell comprising a receptacle, a particulate filling medium for containing the sample contained within the receptacle, and a piston adapted to move linearly in response to volume changes in the sample and filling medium. The receptacle, piston and filling medium are all made from materials having a low coefficient of expansion. In a preferred embodiment, the dilatometer cell comprises a fused quartz cylinder and piston.

3,574,281

DILATOMETER CELL

BACKGROUND OF THE INVENTION

This invention relates to improved apparatus and filling media for making cubical dilatometric measurements and to the method of using such improved apparatus and media in making dilatometric measurements.

Previously, cubical dilatometric measurements (volume change measurements) were made by placing the sample within or on top of a liquid, such as mercury, and detecting the change in volume of the liquid filling medium and sample combination as a function of temperature. This technique presents a number of difficulties. First, the normal liquids used for the filling medium themselves have significant thermal expansion characteristics, which can introduce significant errors into the measurements and restrict the range of temperature over which these measurements can be performed. Secondly, the container for the filling medium and the sample also has significant thermal expansion characteristics which can introduce similar errors and restrictions into the measurements. Thirdly, the filling medium liquids all have severe restrictions on the range of temperatures over which they can be utilized; mercury and silicon oil, for example, each have boiling points below 300° C., and molten salts are liquid only at high temperatures. Fourthly, in measuring the thermal expansion of liquid samples, only those liquids that are immiscible with the liquid of the filling medium can be measured. Finally, the most common filling medium mercury, is toxic to humans.

Thus, it is an object of the present invention to provide an apparatus for making cubical dilatometric measurements over a wide range of temperatures wherein the apparatus, including the filling medium, do not appreciably interfere with the measurements.

It is a further object of the present invention to provide a filling medium that has a useful temperature range significantly larger than the previously used liquid filling media, and additionally, does not require sealing of the receptacle containing the sample and filling medium.

It is a still further object of the present invention to provide a filling medium that will permit cubical dilatometric measurements on a wide variety of sample liquids without regard to the particular miscibility properties of the sample liquids and, at the same time retain the sample liquid substantially completely within the particulate filling medium, eliminating or reducing the errors caused by the effects of the surface tension of the sample liquid against the sides of the container.

SUMMARY OF THE INVENTION

These objectives are accomplished by providing a receptacle, a filling medium disposed within the receptacle for containing the sample and a piston, with the face portion adjacent to the filling medium, disposed within the receptacle in a manner such that it can move linearly in response to volume changes in the filling medium and the sample. The filling medium instead of being in the form of a liquid is in the form of a plurality of small particles. These particles, having individual dimensions and a distribution in size such that, in the region occupied by the sample, substantially all of the space occupied by the sample, are preferably solid and spherical or ellipsoidal in shape and in a preferred embodiment are made from a material having a coefficient of expansion substantially less than the coefficient of expansion of the sample. Fused quartz particles, with a size distribution substantially in the range between 0.1 to 1,000 microns with a distribution maximum near 200 microns, satisfy this criterion. By using fused quartz, in particulate form, the temperature range over which the filling medium can be utilized extends from at least 196° C. to 700° C. When fused quartz is used as the filling medium, then preferably, the receptacle and piston should also be made from fused quartz.

The operation and advantages of this invention can best be explained by reference to the following FIGS. in which:

FIG. 1 is a cross-sectional view of one embodiment of the cubical dilatometer of the present invention containing the particulate filling media, and FIG. 2 is a plot of the change in volume of a sample of polystyrene as a function of temperature as measured on a cubical dilatometer such as the one illustrated in FIG. 1.

DETAILED DESCRIPTION OF DRAWINGS

Figure 1:
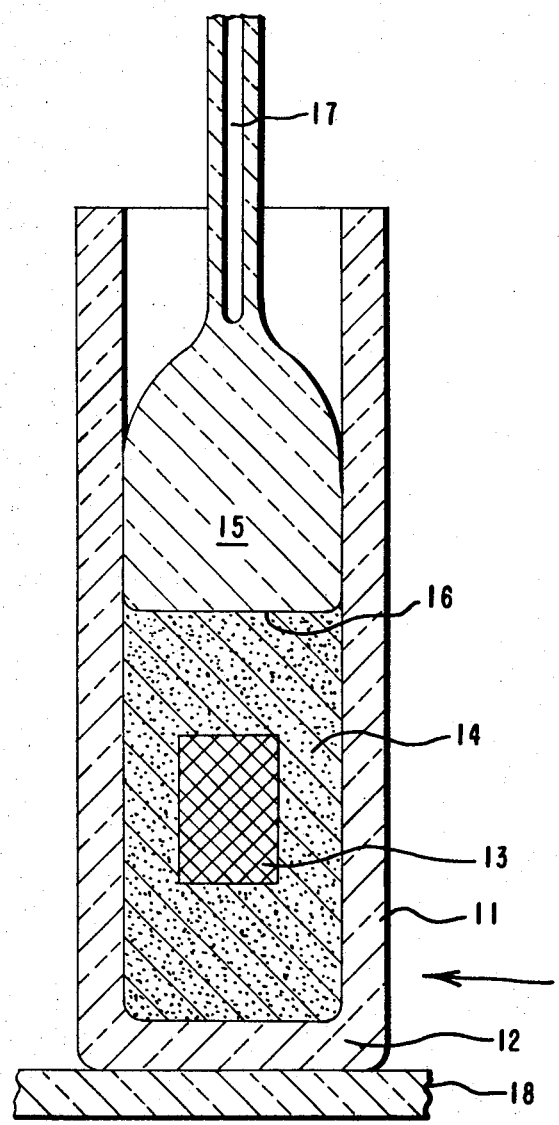

In FIG. 1, the receptacle 20 is in the form of a cylinder having cylindrical sides 11 permanently and securely fastened to a base 12. A fixed base is not considered essential to the invention, however, since it is conceivable that the bottom can be a movable stage, extending to side 11, and, perhaps, being utilized in some manner in the measurement process. The receptacle can be made from any material suitable for the temperature range of the measurement, but a material with a low, constant coefficient of thermal expansion is preferable (a material with a coefficient of expansion no larger than one-tenth the coefficient of expansion of the sample over the temperature range of the measurement will be considered a material with a low coefficient of expansion). Fused quartz is particularly useful in the context because of its extremely low coefficient of thermal expansion (viz. $5.0-10.0 \times 10^{17}/°$ C.) over a large temperature range (at least from $-196°$ C. to $+700°$ C.)

The sample to be measured 13 is placed within the particulate filling medium. The method of depositing the sample will vary with the type of sample. If the sample is a solid, one way to introduce it into the filling medium is to place a quantity of the filling medium in the bottom of the receptacle, place the sample 13 on top of this filling medium, approximately in the center of the receptacle and, then, surround and cover the sample with the particulate filling medium. In case of liquid samples, there are at least two ways in which the sample can be placed in the filling medium. One way is to deposit the total amount of the particulate filling medium in the receptacle and then to inject the liquid sample, using a hypodermic syringe, into the center of the filling medium. Alternatively, the liquid sample can be mixed with a quantity of the particulate filling medium, forming a pastelike substance, and this paste placed within the receptacle, either by itself or in conjunction with additional filling medium in the manner described above for a solid sample.

The filling medium 14 comprises a plurality of small particles. It is preferable that the particles be solid, have a distribution in their sizes, and, like the receptacle above, be constructed of a material that has a coefficient of thermal expansion that is no larger than one-tenth of the coefficient of expansion of the sample 13. In a preferred embodiment, the filling medium comprises solid fused quartz particles, either spherical or ellipsoidal in shape, with a size distribution between 0.1 to 1,000 microns and a distribution maximum near 200 microns. Solid particles are preferred for their mechanical strength and because the possibility that the particles will develop fissures and become filled with portions of liquid sample is avoided. A distribution in the sizes of the particles allows the smaller particles to fill the interstitial spaces between the larger particles, with a resulting overall compactification of the filling medium. Thus, "settling" of the filling medium and/or filling of the interstitial spaces by the sample, if it is a liquid, are less significant problems than they would be if the particles were all of the same size. The distribution mentioned above, approximately from 0.1 to 1,000 microns with the maximum near 200 microns has been found to be superior to the others tried.

Having a coefficient of thermal expansion that is low with respect to that of the sample allows volumetric changes in the latter to be measured without interference from the former. As stated above for the receptacle, fused quartz is preferred in that it has the very low coefficient of thermal expansion over the large temperature range mentioned. The spherical or elliptical shape of the particles has the additional advantage that it allows the filling medium particles to be compacted, i.e.

the interstitial spaces to be reduced, more readily. Spherically-shaped particles having flow properties that are similar to those of a liquid, appeared to be slightly preferable in this regard, but ellipsoidally-shaped particles, which can be formed from a high bulk density fused silica, perform almost as well. In either case, a slight tap on the receptacle after the sample and filling medium have been placed therein will aid in the final filling.

A piston 15 is disposed within the receptacle 11, fitting snugly therein. The face portion 16 of this piston is adjacent to the filling medium 14 and extends substantially to the side of the receptacle. For the reasons mentioned above for the receptacle itself and for the filling medium, it is preferable that the piston be constructed of a material with a low coefficient of thermal expansion, and, ideally, from fused quartz. It has been found that the face portion 16 of the piston performs best if it is flat, although other shapes, e.g. semispherical, can perform satisfactorily. The piston face 16 should extend substantially to the sides of the receptacle in order to retain substantially all of the filling medium in front of it, and thus move precisely in accordance with the expansion of the filling medium-sample combination without having any of the filling medium escape through the space between the receptacle side and the piston face. In the embodiment illustrated, since the receptacle is cylindrical, the face of the piston is round and its diameter is no more than 0.005 inch smaller than the inside diameter of the receptacle; although a range of from 0.001 to 0.025 has been found to be satisfactory in other embodiments. Attached to the rear portion of the piston is a probe 17, made, in this instance, of the same material as the face of the piston. This probe moves as a result of any expansion (or contraction) of the filling medium-sample combination.

A stage 18 upon which the receptacle rests, a means (not shown) for detecting the motion of the piston probe and relating this motion to desired quantities, and a means (not shown) for controlling and varying the temperature of the apparatus are normally provided to complete the instrument. One convenient means for providing these is the Du Pont 941 Thermal Mechanical Analyzer, but it is to be understood that any other suitable means known to those skilled in the art for providing these features will suffice.

Solid samples are easily measured by means of this invention. There are, however, two other factors which must be taken into considerations when measuring liquids. The first is the requirement that the filling medium be inert to the liquid sample. Fused quartz is an ideal choice for this purpose in that only a few materials are known which attack it (in which case, an alternate filling medium may be employed). The second is that nonviscous liquids, having a tendency to flow into the interstitial spaces of the filling medium and to the sides of the container, may produce conditions which result in erroneous measurements. This is particular problem when measuring absolute volume changes, but is of little concern when only the relative change is being measured. Highly viscous liquids do not present problems of this nature.

Two variations on the above-mentioned technique are given here. Cubical dilatometric measurements by means of the present invention upon those solids which melt into highly nonviscous liquids, when the measurements are made at and above the temperatures at which such changes occur, may cause anomalies due to the fact that upon such a change, the now nonviscous liquid sample may partially flow into the interstitial spaces of the filling medium, thereby vacating part of the volume previously occupied by the sample material in the solid state, and thereby give an erroneous indication of contraction in volume. This anomaly may be readily circumvented by the following steps: (a) the above procedure is followed whereby the solid sample is placed within the filling medium and the system heated to and somewhat above the temperature at which the sample becomes a nonviscous liquid; (b) pressure is applied to the filling medium and melted sample by means of the probe and piston in order to disperse the melted sample throughout the filling medium as much as possible, or at least as much as could possibly be expected to occur in the usual dilatometric measurements; (c) the system is cooled to the desired starting temperature; and (d) the cubical dilatometric measurement is then performed in the usual fashion. By this process, it is clearly seen that the effects of the flowing of the melted sample into the interstitial spaces and the accompanying vacating of the volume previously occupied by the solid are eliminated before the actual measurement process in (d) above. However, it should be mentioned that when the solid sample becomes a highly nonviscous liquid, the possibly erroneous results as to the absolute volumetric changes of such a nonviscous liquid, as mentioned above, may occur. Nonetheless, the relative volume changes of the sample material as it changes from the solid into the liquid and of the sample in the liquid state are all preserved. The second variation of the usual technique for performing cubical dilatometric measurements may be employed with particular benefit when, for some reason as, for example, when the sample attacks fused quartz, it is desired to use a material for the receptacle, piston and/or the filling medium that has an appreciable coefficient of thermal expansion. This technique, a differential measurement, comprises measuring the thermal expansion of a receptacle, piston, and filling medium system but without any sample; performing a similar measurement either prior, simultaneously, or subsequently to the first but with the sample material positioned within a like quantity of the same type of or the exact same filling medium used for the above measurement, where a receptacle is used that is either the same or very similar to the receptacle used for the above measurement; and subtracting the results of the former measurement from the latter. By this means the effects of the expansion of the apparatus and/or the filling medium may to a large extent be eliminated.

Figure 2:
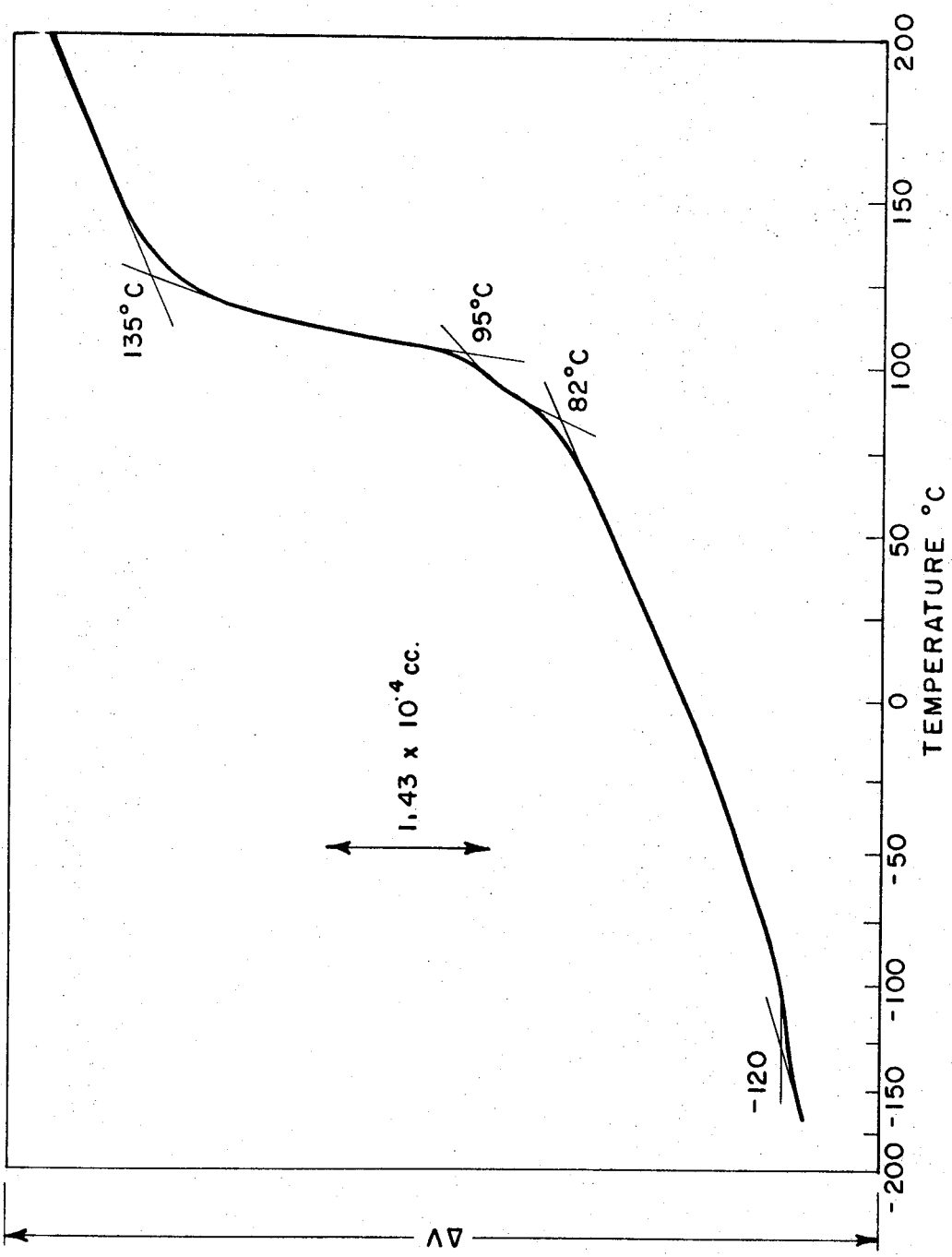

The advantages of the present invention will be apparent from the following example described in conjunction with FIG. 2. It is to be understood, however, that the example, is merely illustrative, and should not be considered to limit the scope of this invention.

FIG. 2 shows the results of measurements made upon polystyrene, a solid over the temperature range of the measurements. The changes in the slope of the curve in FIG. 2 show transitions at −120° C., 82° C. and 95° C. The previous cubical dilatometers do not have sufficient sensitivity to resolve the two transitions at 82° C. and 95° C. and show that the former is a second order transition, and the latter a first order transition. This example shows clearly the superior information that the present invention provides about the basic thermodynamic quantity, the change in volume with temperature of various samples.

We claim:

1. A sample cell for a dilatometer comprising:
   a. a receptacle;
   b. a filling medium disposed within said receptacle and adapted to contain a sample, said filling medium being comprised of a plurality of small particles having individual dimensions and a distribution in size such that, in the region occupied by said sample, said sample occupies substantially all of the space between said particles, said filling medium being made from a material having a coefficient of expansion less than the coefficient of expansion of said sample; and
   c. a piston movably disposed within said receptacle, said piston having a face portion adjacent to the surface of said filling medium and being adapted to move linearly in response to volume changes in said filling medium and said sample, said receptacle and said piston being made from a material having a coefficient of expansion less than the coefficient of expansion of said sample.

2. The sample cell of claim 1 wherein said filling medium is made from a material having a coefficient of expansion less than or equal to one-tenth the coefficient of expansion of said sample, and said piston and said receptacle are made from materials having a coefficient of expansion less than or equal to the coefficient of expansion of said filling medium.

3. The sample cell of claim 1 wherein the particles of said filling medium are in the form of solid spheres.

4. The sample cell of claim 1 wherein the particles of said filling medium are in the form of solid ellipsoides.

5. The sample cell of claim 1 wherein the particles comprising said filling medium have a size distribution ranging substantially between 0.1 and 1,000 microns, with a distribution maximum near 200 microns.

6. The sample cell of claim 1 wherein the face of said piston is substantially flat.

7. The sample cell of claim 1 wherein said receptacle and said piston are made of fused quartz.

8. The sample cell of claim 1 wherein the particles of said filling medium are fused quartz particles.

9. The sample cell of claim 1 wherein said receptacle, said piston and the particles of said filling medium are made of fused quartz.

10. A sample cell for a cubical dilatometer comprising:
 a. a receptacle;
 b. a filling medium disposed within said receptacle and adapted to contain a sample, said filling medium being comprised of a plurality of small particles having individual dimensions and a distribution in size such that, in the region occupied by said sample, said sample occupies substantially all of the space between said particles; and
 c. a piston movably disposed within said receptacle, said piston having a face portion adjacent to the surface of said filling medium and being adapted to move linearly in response to volume changes in said filling medium and said sample.

11. A method for making thermodilametric measurements on a sample, comprising:
 a. introducing said sample into a predetermined quantity of filling medium contained in a receptacle, said filling medium comprising a plurality of small particles having individual dimensions and a distribution in size such that, in the region occupied by said sample, said sample occupies substantially all of the space between said particles, said filling medium being made from a material having a coefficient of expansion less than or equal to one-tenth the coefficient of expansion of said sample;
 b. disposing a piston within said receptacle in movable association therewith and in a manner such that said piston will move linearly in response to volume changes in said filling medium and said sample;
 c. varying in a controlled manner the temperature of said filling medium and said sample; and
 d. monitoring the motion of said piston as a function of temperature.

12. The method of claim 11 wherein said sample is a liquid sample and the step of depositing said sample into said filling medium is accomplished by injecting said sample into the interior of said filling medium.

13. The method of claim 11 wherein said sample is a liquid sample and the step of depositing said sample into said filling medium is accomplished by first mixing said sample with at least a portion of said filling medium to form a paste and then depositing the paste so formed with any remaining portion of said filling medium into said receptacle.

14. The method of making thermodilametric measurements on a sample comprising:
 a. introducing said sample into a predetermined quantity of filling medium contained in a first receptacle and comprised of a plurality of particles having individual dimensions and a distribution in size such that, in the region occupied by said sample, said sample occupies substantially all of the space between said particles, said filling medium being made from a material having a coefficient of expansion less than or equal to one-tenth the coefficient of expansion of said sample;
 b. introducing an equal quantity of said filling medium into a second receptacle, said first and second receptacles being substantially identical and being made from a material having a coefficient of expansion less than or equal to the coefficient of expansion of said filling medium;
 c. disposing a first piston within said first receptacle and a second piston within said second receptacle, each piston being disposed within the receptacle associated therewith in movable association and in a manner such that each piston will move in response to changes in the volume of the receptacle associated therewith occupied by the substance contained therein;
 d. varying the temperature of said first and second receptacle in a controlled and equal manner; and
 e. monitoring the motion of said first piston relative to said second piston.

PO-1050
(5/69)

UNITED STATES PATENT OFFICE
CERTIFICATE OF CORRECTION

Patent No. 3,574,281     Dated April 13, 1971

Inventor(s)  Donald L. Casey  and  Gerald W. Miller

It is certified that error appears in the above-identified patent and that said Letters Patent are hereby corrected as shown below:

Column 1, line 62, after "space" insert --is--.

Column 1, line 71, change "196°C." to -- -196°C. --

Claim 4, line 2, change "ellipsoides" to

--ellipsoids--.

Claim 11, line 1, "thermodilametric" should read

--thermodilatometric--.

Claim 11, line 3, "predetermined" should be deleted.

Claim 14, line 1, "thermodilametric" should read

--thermodilatometric--.

Claim 14, line 3, "predetermined" should be deleted.

Signed and sealed this 15th day of February 1972.

(SEAL)
Attest:

EDWARD M. FLETCHER, JR.          ROBERT GOTTSCHALK
Attesting Officer                Commissioner of Patents